(12) United States Patent
Kakutani

(10) Patent No.: US 11,934,716 B2
(45) Date of Patent: Mar. 19, 2024

(54) PRINT SYSTEM AND METHOD OF CONTROLLING PRINT SYSTEM FOR ACQUIRING A LOG OF A PRINT APPARATUS

(71) Applicant: CANON KABUSHIKI KAISHA, Tokyo (JP)

(72) Inventor: Naoya Kakutani, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 17/673,592

(22) Filed: Feb. 16, 2022

(65) Prior Publication Data
US 2022/0269455 A1    Aug. 25, 2022

(30) Foreign Application Priority Data

Feb. 22, 2021  (JP) ................... 2021-026675

(51) Int. Cl.
*G06F 3/12* (2006.01)
(52) U.S. Cl.
CPC .......... *G06F 3/1222* (2013.01); *G06F 3/1238* (2013.01)
(58) Field of Classification Search
None
See application file for complete search history.

(56) References Cited

U.S. PATENT DOCUMENTS

2014/0002847 A1 * 1/2014 Mizuno .............. G06K 15/4095
358/1.14

FOREIGN PATENT DOCUMENTS

| EP | 1069741 A1 * | 1/2001 | .......... G06F 11/3409 |
| JP | 2014146206 A | 8/2014 | |

* cited by examiner

Primary Examiner — Thomas D Lee
(74) Attorney, Agent, or Firm — Canon U.S.A., Inc. IP Division

(57) ABSTRACT

A print system includes at least one multi-function peripheral (MFP) and an administration server that communicates with the MFP via a network. The administration server accepts user-identification information and an instruction to acquire an audit log of an operating user of the MFP, the instruction specifying the operating user as an audit target. In a case where an assigned group of a user corresponding to the user-identification information and an assigned group of the operating user as the audit target match or correspond to each other, the administration server transmits the instruction to the MFP. The MFP stores the audit log and the operating user of the MFP in association with each other, and transmits the audit log of the operating user specified in the received instruction to the server.

20 Claims, 13 Drawing Sheets

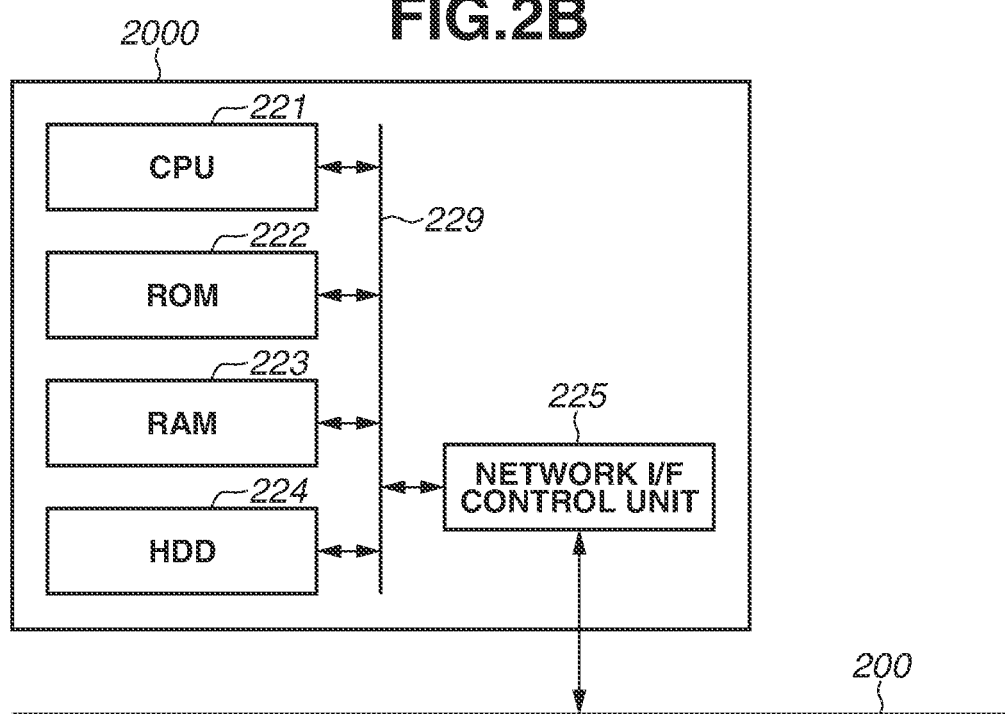
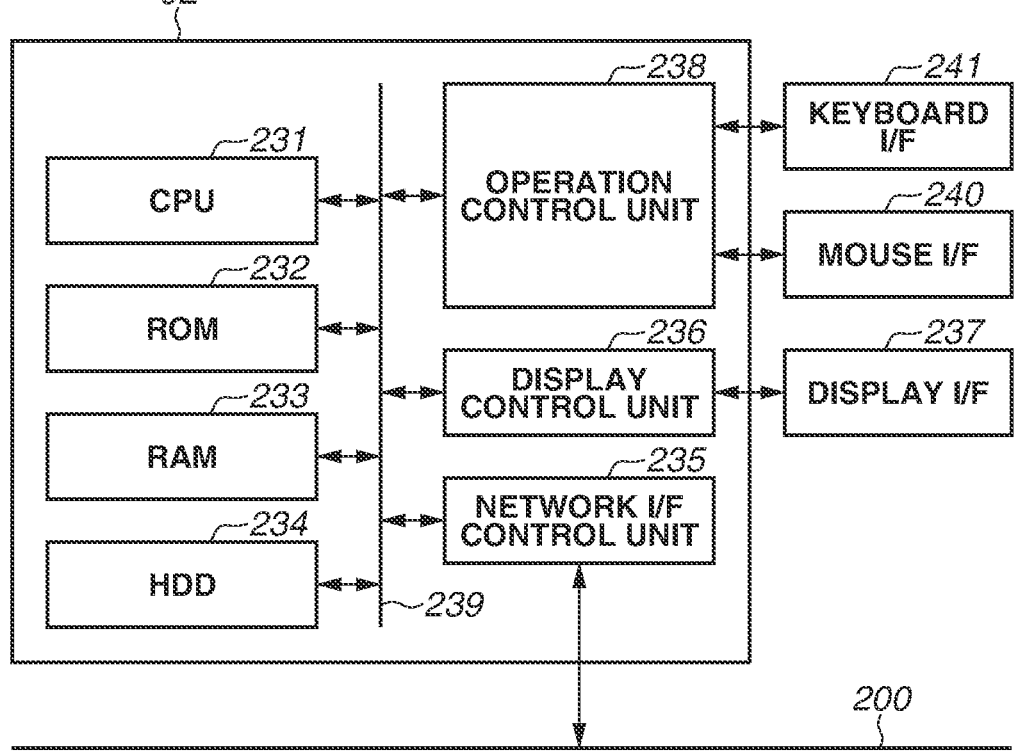

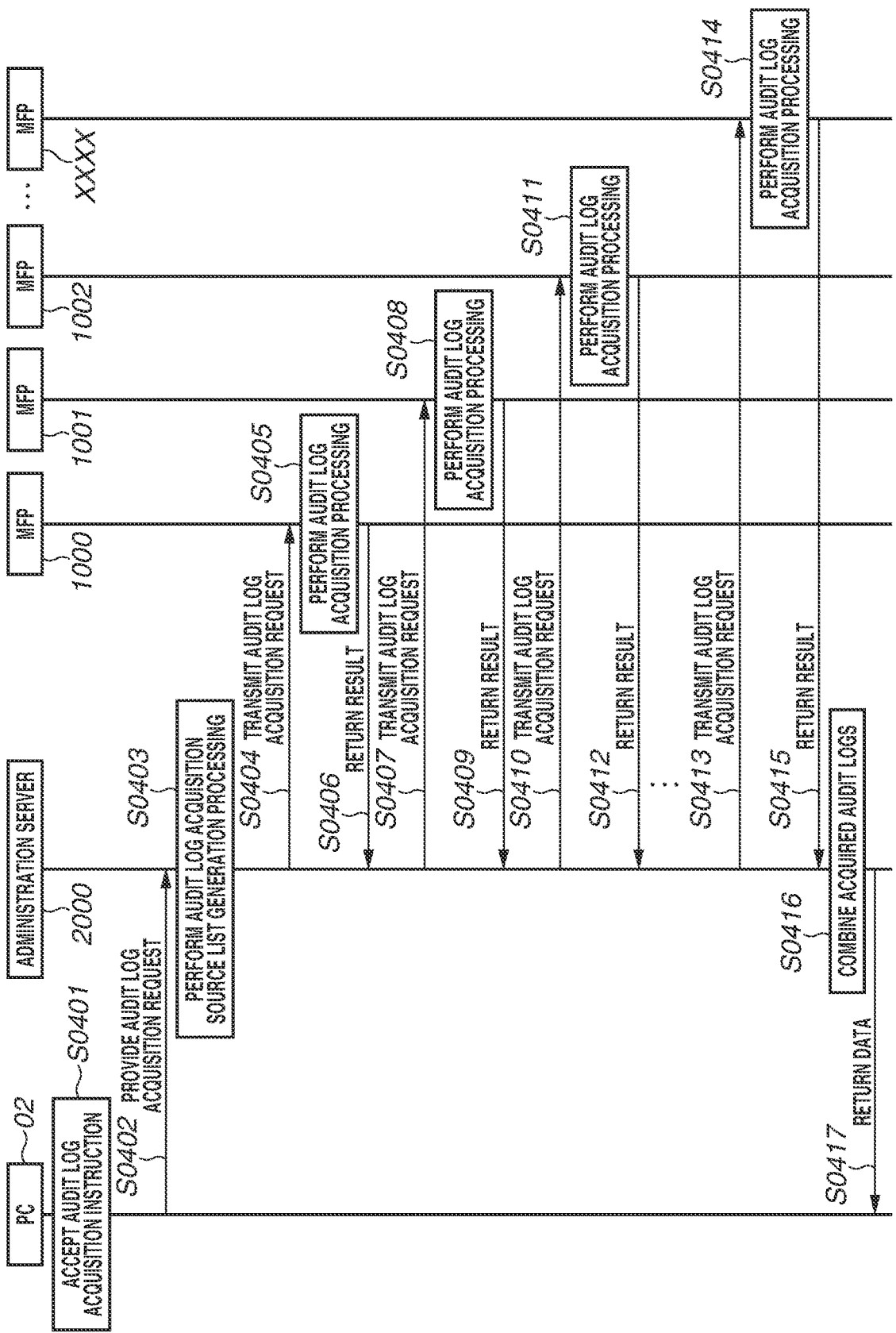

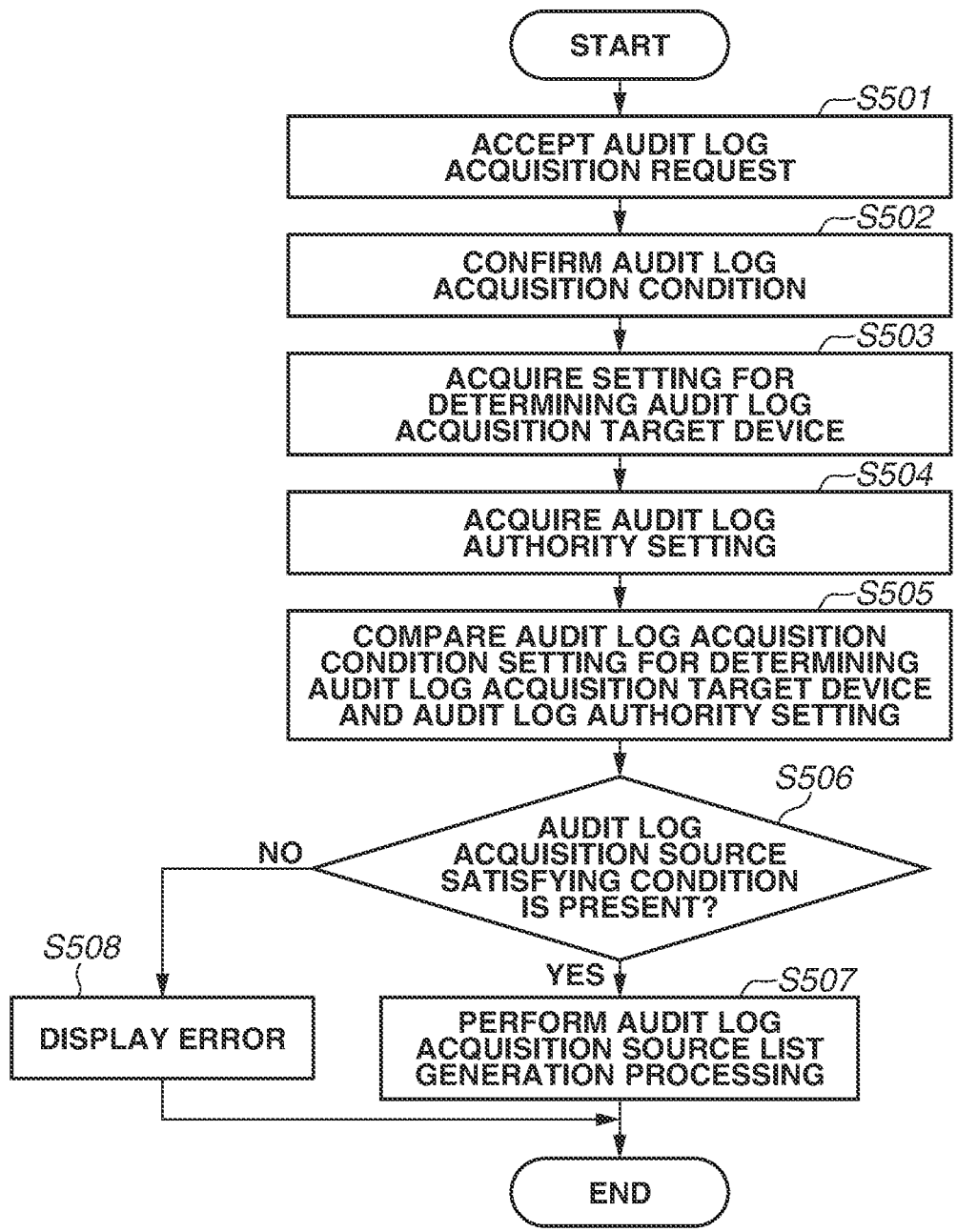

FIG.6A

AUDIT LOG ACQUISITION TARGET DEVICE SETTING SCREEN (MANAGEMENT TABLE A)

| USER ID | ASSIGNED GROUP | ACQUISITION TARGET DEVICE |
|---|---|---|
| user001 | AA DEPARTMENT 01 SECTION | MFP 1000 |
| user002 | AA DEPARTMENT 01 SECTION | MFP 1000<br>MFP 1001 |
| user003 | AA DEPARTMENT 01 SECTION | MFP 1001<br>MFP 1002 |
| user004 | AA DEPARTMENT 02 SECTION | MFP 1002 |
| user005 | AA DEPARTMENT 02 SECTION | MFP 1002 |
| user006 | BB DEPARTMENT 01 SECTION | MFP 1004 |
| user007 | BB DEPARTMENT 02 SECTION | MFP 1004<br>MFP 1005 |
| ... | ... | ... |
| user100 | ZZ DEPARTMENT 99 SECTION | MFP XXXX |

[ ENTER ]   [ CANCEL ]

FIG.6B

AUDIT LOG ACQUISITION TARGET DEVICE SETTING SCREEN (MANAGEMENT TABLE a)

| USER ID | ASSIGNED GROUP | ACQUISITION TARGET DEVICE |
|---|---|---|
| user001 | AA DEPARTMENT 01 SECTION | MFP 1000<br>MFP 1001 |
| user002 | AA DEPARTMENT 01 SECTION | MFP 1000<br>MFP 1001 |
| user003 | AA DEPARTMENT 01 SECTION | MFP 1001<br>MFP 1002 |
| user004 | AA DEPARTMENT 02 SECTION | MFP 1002 |
| user005 | AA DEPARTMENT 02 SECTION | MFP 1002 |
| user006 | BB DEPARTMENT 01 SECTION | MFP 1004 |
| user007 | BB DEPARTMENT 02 SECTION | MFP 1004<br>MFP 1005 |
| ... | ... | ... |
| user100 | ZZ DEPARTMENT 99 SECTION | MFP XXXX |

[ ENTER ]   [ CANCEL ]

FIG.7A

AUDIT LOG AUTHORITY SETTING SCREEN (MANAGEMENT TABLE B) — 701

| ASSIGNED GROUP (702) | AUDIT-LOG REFERENCE ENABLED AUTHORITY (703) | AUDIT-LOG OPERATION ENABLED AUTHORITY (704) |
|---|---|---|
| AA DEPARTMENT 01 SECTION | · SECURITY ADMINISTRATOR<br>· AA DEPARTMENT DIRECTOR<br>· AA DEPARTMENT 01 SECTION MANAGER | SECURITY ADMINISTRATOR |
| AA DEPARTMENT 02 SECTION | · SECURITY ADMINISTRATOR<br>· AA DEPARTMENT DIRECTOR<br>· AA DEPARTMENT 02 SECTION MANAGER | SECURITY ADMINISTRATOR |
| BB DEPARTMENT 01 SECTION | · SECURITY ADMINISTRATOR<br>· BB DEPARTMENT DIRECTOR<br>· BB DEPARTMENT 01 SECTION MANAGER | SECURITY ADMINISTRATOR |
| BB DEPARTMENT 02 SECTION | · SECURITY ADMINISTRATOR<br>· BB DEPARTMENT DIRECTOR<br>· BB DEPARTMENT 02 SECTION MANAGER | SECURITY ADMINISTRATOR |
| ... | ... | ... |
| ZZ DEPARTMENT 99 SECTION | · SECURITY ADMINISTRATOR<br>· ZZ DEPARTMENT DIRECTOR<br>· ZZ DEPARTMENT 99 SECTION MANAGER | SECURITY ADMINISTRATOR |

[ ENTER ] ~705    [ CANCEL ] ~706

FIG.7B

AUDIT LOG AUTHORITY SETTING SCREEN (MANAGEMENT TABLE b)

| USER ROLE | LOG-REFERENCE ENABLED ASSIGNED GROUP | AUDIT-LOG OPERATION ENABLED ASSIGNED GROUP |
|---|---|---|
| SECURITY ADMINISTRATOR | ALL | ALL |
| AA DEPARTMENT DIRECTOR | AA DEPARTMENT | — |
| AA DEPARTMENT 01 SECTION MANAGER | AA DEPARTMENT 01 SECTION | — |
| AA DEPARTMENT 02 SECTION MANAGER | AA DEPARTMENT 02 SECTION | — |
| BB DEPARTMENT DIRECTOR | BB DEPARTMENT | — |
| BB DEPARTMENT 01 SECTION MANAGER | BB DEPARTMENT 01 SECTION | — |
| BB DEPARTMENT 02 SECTION MANAGER | BB DEPARTMENT 02 SECTION | — |
| ZZ DEPARTMENT DIRECTOR | ZZ DEPARTMENT | — |
| ... | ... | ... |
| ZZ DEPARTMENT 99 SECTION MANAGER | ZZ DEPARTMENT 99 SECTION | — |

[ENTER] [CANCEL]

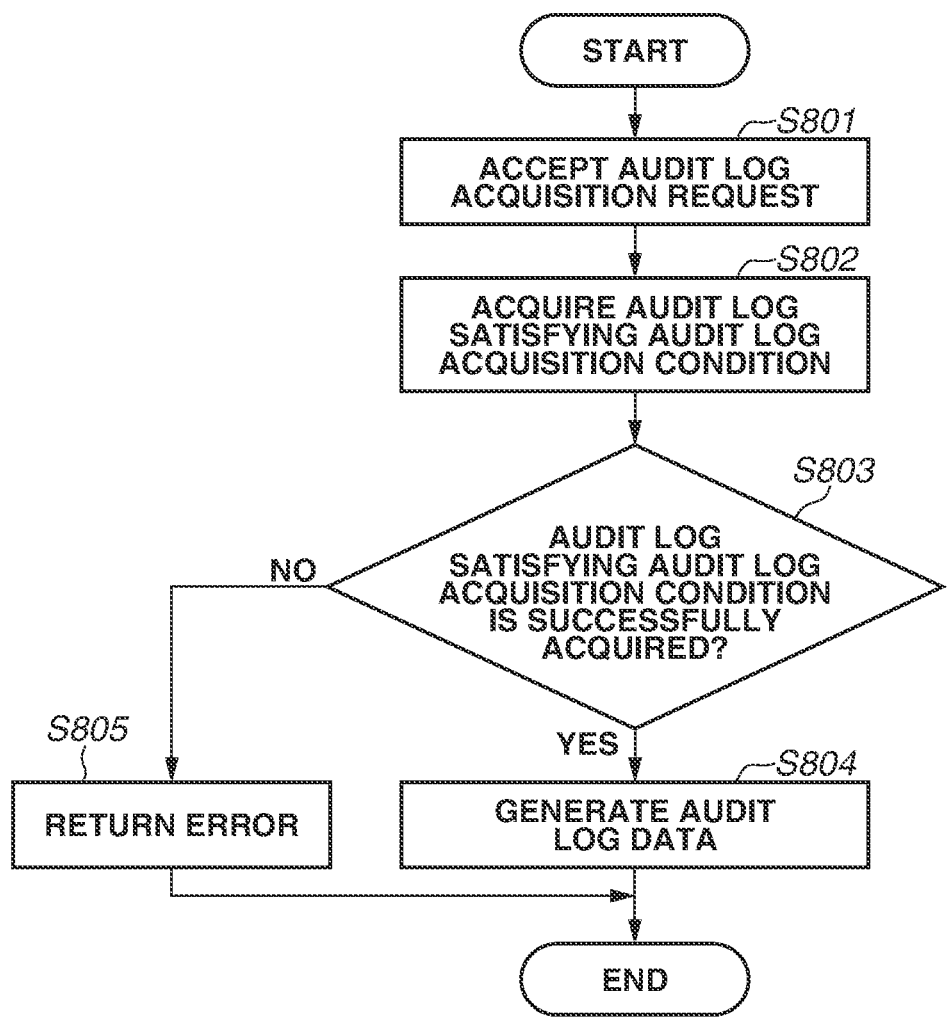

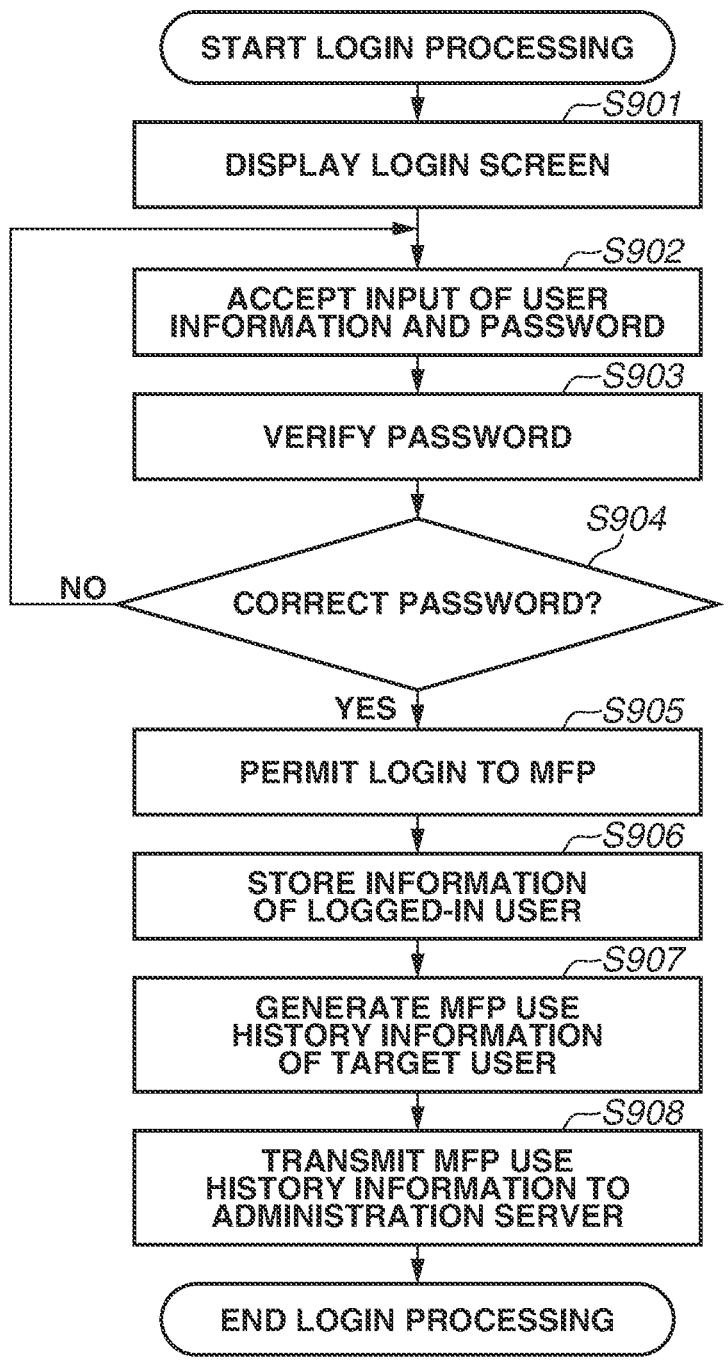

FIG.11

AUDIT LOG ACQUISITION CONDITION SETTING

USER NAME ~111a

PASSWORD ~111b

ACQUISITION RANGE
○ ACQUIRE ALL AUDIT LOGS ~112
● ACQUIRE SPECIFIED AUDIT LOG ~113

ACQUISITION TARGET ~114
SPECIFY "ASSIGNED GROUP NAME" OR "OPERATING USER ID" OF AUDIT LOG TO BE ACQUIRED.

ACQUISITION PERIOD
START ▼YEAR ~115 ▼MONTH ~116 ▼DATE ~117 ▼ ~118 : ▼ ~119
END ▼YEAR ~120 ▼MONTH ~121 ▼DATE ~122 ▼ ~123 : ▼ ~124

110

PRINT SYSTEM AND METHOD OF CONTROLLING PRINT SYSTEM FOR ACQUIRING A LOG OF A PRINT APPARATUS

BACKGROUND

Field of the Disclosure

The present disclosure relates to an audit log function provided in a print system to improve security.

Background Art

Japanese Patent Application Laid-Open No. 2014-146206 discusses a function of a log administration server which accesses a print apparatus to acquire an audit log. In general, such audit-log acquisition is performed by an administrator of information apparatuses or print apparatuses, or a security administrator in an organization. The administrator can collectively acquire all audit logs held in apparatuses and refer to all the acquired audit logs.

SUMMARY

According to embodiments of the present disclosure, a print system includes at least one print apparatus, and a server configured to communicate with the at least one print apparatus via a network, wherein the server includes an acceptance unit configured to accept user-identification information and an instruction to acquire an audit log of an operating user of the at least one print apparatus, the instruction specifying the operating user as an audit target, and a first transmission unit configured to transmit, in a case where an assigned group of a user corresponding to the user-identification information and an assigned group of the operating user as the audit target match or correspond to each other, the instruction to the at last one print apparatus, and wherein the at least one print apparatus includes a first storage unit configured to store the audit log and the operating user of the print apparatus in association with each other, a first reception unit configured to receive the instruction from the server, and a second transmission unit configured to transmit the audit log of the operating user specified in the received instruction to the server.

Further features of the present disclosure will become apparent from the following description of exemplary embodiments with reference to the attached drawings.

BRIEF DESCRIPTION OF THE DRAWINGS

FIG. 2B is a diagram illustrating an example of a hardware configuration of an administration server. FIG. 2C is a diagram illustrating an example of a hardware configuration of a personal computer (PC), according to the exemplary embodiment.

FIG. 4 is a flowchart illustrating a processing procedure from acceptance of an instruction to acquire an audit log to transmission of the audit log according to the exemplary embodiment.

FIG. 5 is a diagram illustrating a processing procedure for generating an audit log acquisition source list according to the exemplary embodiment.

FIGS. 6A and 6B are diagrams each illustrating an example of a setting screen for determining a device as a target for acquiring an audit log according to the exemplary embodiment.

FIGS. 7A and 7B are diagrams each illustrating an example of a setting screen for audit log authority according to the exemplary embodiment.

FIG. 8 is a flowchart illustrating a procedure of audit log acquisition processing according to the exemplary embodiment.

FIG. 9 is a flowchart illustrating a procedure of login processing according to the exemplary embodiment.

FIG. 11 is a diagram illustrating an example of a setting screen for an audit log acquisition condition according to the exemplary embodiment.

DESCRIPTION OF THE EMBODIMENTS

Figure 1:
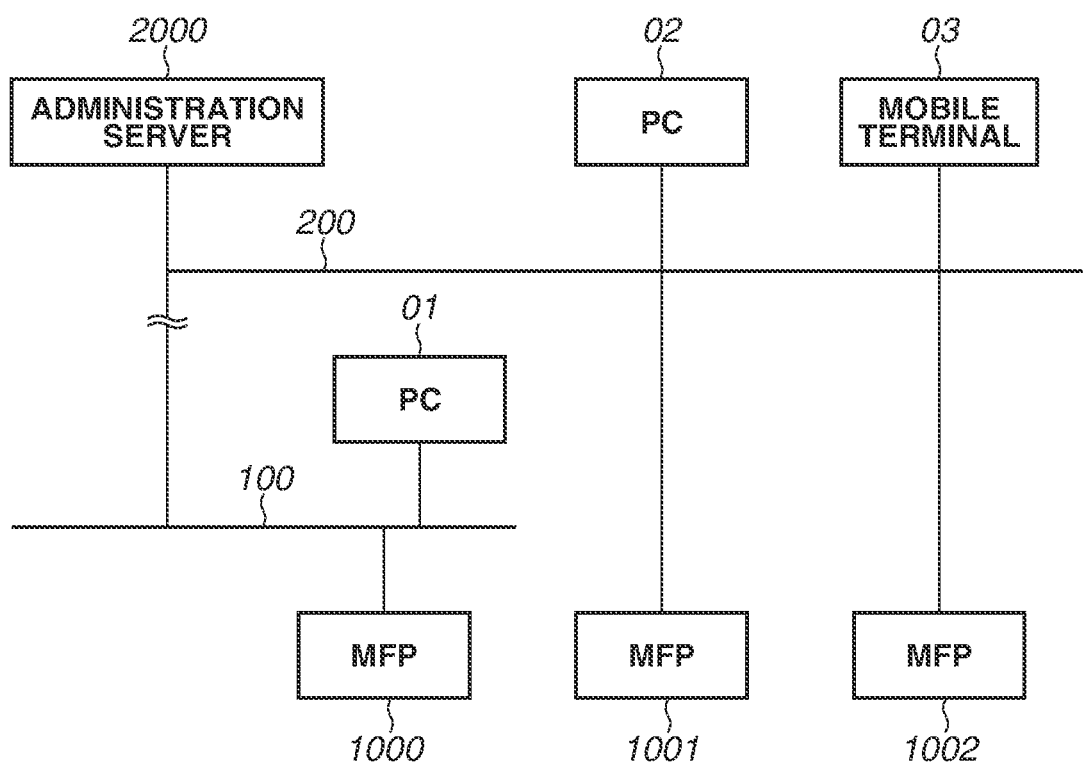
FIG. 1 is a diagram illustrating an example of a print system configuration according to an exemplary embodiment.

As one of functions of information apparatuses and print apparatuses, recording operations of apparatuses as a log has been known. Recording of a log is utilized to grasp apparatus usage states, to facilitate audits, and to prevent information leakage. Such a log is called an audit log. When information leakage or unauthorized access to an apparatus is detected, an audit log is referred to and checked to confirm such unauthorized operation.

In recent years, installation locations of information apparatuses and print apparatuses and user environments of these apparatuses have diversified, and an increasing number of users accesses these apparatuses directly from an external network, such as the Internet, as another usage pattern of these apparatuses in addition to accessing to these apparatuses within a firewall. Accordingly, occurrences of information leakage from these apparatuses and attacks on these apparatuses by manipulations regardless of whether information leakage or attacks happen inside or outside offices have become an issue. Because of the expansion of use of information apparatuses and print apparatuses as described above, security measures have been shifting in recent years from defense based on boundary-type security, such as a firewall, to defense based on zero trust security. The defense based on zero trust security is an approach strictly based on the view of human nature as fundamentally evil to defend apparatuses directly connected to the Internet. The function of an audit log has become increasingly important also from the viewpoint of the approach of providing the defense based on zero trust security.

However, in recent years, not only a security administrator of an organization but also a person in charge of each department of the organization has been expected to check whether each member of his/her own department is working appropriately, with increasing diversity in working styles in terms of working locations including inside or outside an office, such as teleworking. For example, while a director of a department can grasp actions of staffs of the department to some extent inside an office, actions of staffs in a satellite office or at home cannot be monitored. Thus, it may be desirable for the director to check audit logs to determine whether information apparatuses and print apparatuses are not fraudulently used.

Since an audit log available from an information apparatus or a print apparatus is a log of a large number of users and operation histories of the apparatus, individual department directors of an organization are not allowed to refer to the audit log. It is because an audit log is classified as confidential information, and thus it is undesirable that an audit log that is prohibited from referring to is referred to by a person without authority.

Consequently, a limitation may be imposed such that a director of a department is allowed to refer to only an audit log related to his/her own department, unlike a security administrator who can refer to all audit logs.

Exemplary embodiments of the present disclosure will be described below with reference to the drawings. In the present exemplary embodiments, a multi-function peripheral (MFP, or a digital MFP) having a user authentication function is used an example. However, typically, the user authentication function can also be used in a single function peripheral (SFP), and thus, the applicability of the exemplary embodiments is not limited to the MFP.

FIG. 1 illustrates an example of a network configuration according to an exemplary embodiment. In the present exemplary embodiment, a system in which a plurality of MFPs and an administration server communicate with each other via a network as illustrated FIG. 1 will be referred to as a print system.

An MFP 1000 has a print function and an audit log function. The MFP 1000 can transmit and receive print data, scanned image data, device management information, and the like to and from other information processing apparatuses via an internal network 100.

An audit log in the present exemplary embodiment refers to a record providing information about when, where and who has performed what processing. Specifically, examples of the audit log includes a job log providing a record of a history of a user or device operation, an operation log of a user interface (UI), a record on image data at the time of execution of scanning and printing, packet information at the time of network communication, or the like. Since a type of the audit log to be used in an audit depends on what kind of information an administrator desires to audit, a type of the audit log is not particularly limited.

The MFP 1000 can also communicate with an administration server 2000 via the internal network 100 and an external network 200. In the present exemplary embodiment, the internal network 100 in the present exemplary embodiment is an in-house network protected by a firewall or gateway within an office, and the external network 200 is a network directly accessible from the Internet, but these are not particularly limited. A personal computer (PC) 01 as an electronic apparatus can perform user authentication for the MFP 1000 and can refer to and operate the MFP 1000, via the internal network 100.

The administration server 2000 can communicate with an MFP, a PC, and a mobile terminal via the external network 200. An MFP 1001 and an MFP 1002 are MFPs directly connected to the external network 200. In the present exemplary embodiment, the MFP 1001 is installed in a shared space, such as a coworking space, and the MFP 1002 is installed in a home for teleworking, but these are not particularly limited. A PC 02 as an electronic apparatus and a mobile terminal 03 can each perform user authentication for the MFPs 1000 to 1002 and can refer to and operate the MFPs 1000 to 1002, via the external network 200.

Each of the MFPs 1000 to 1002 in the present exemplary embodiment can perform scan and print in itself, and can also perform print execution and storage of scan data via the administration server 2000.

The number of apparatuses, such as the MFP, the administration server, the PC, and the mobile terminal illustrated in FIG. 1 is merely an example. The number of each type of these apparatuses is not limited to the illustrated number and may be configured as a plurality of apparatuses. The administration server 2000 is not limited to the illustrated example, and may be connected to a different cloud storage via the external network 200.

Figure 2A:
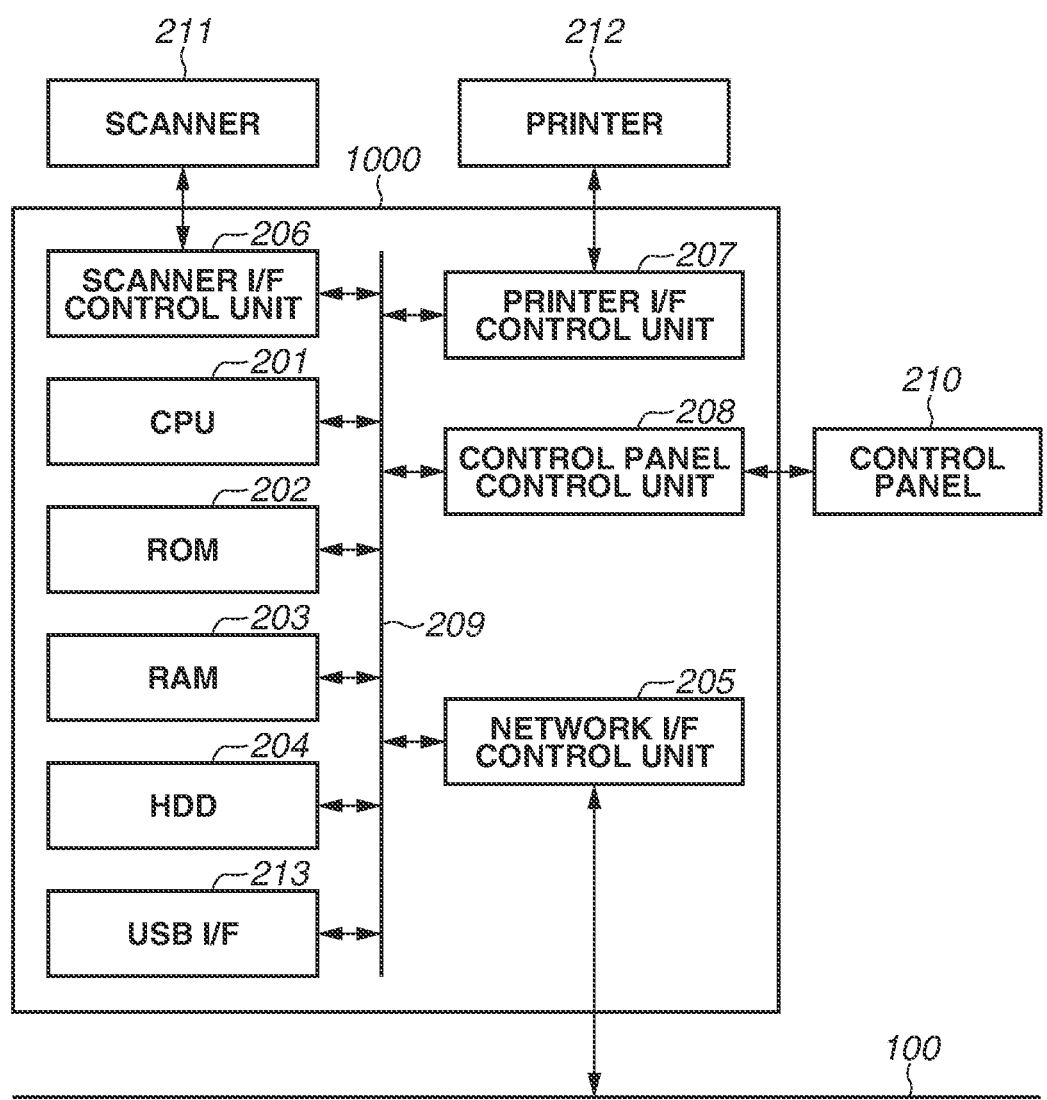
FIG. 2A is a diagram illustrating an example of a hardware configuration of a multi-function peripheral (MFP)

FIG. 2A is a block diagram illustrating a schematic configuration of the MFP 1000 according to the present exemplary embodiment.

A central processing unit (CPU) 201 executes a software program of the MFP 1000 to control the entire apparatus. A read only memory (ROM) 202 stores a boot program, fixed parameters, and the like of the MFP 1000. A random access memory (RAM) 203 is used to store a program, temporary data, and the like when the CPU 201 controls the MFP 1000. A hard disk drive (HDD) 204 stores system software, an application, and various data. The CPU 201 executes the boot program stored in the ROM 202, and loads a program stored in the HDD 204 into the RAM 203 and executes the loaded program, whereby the CPU 201 controls operation of the MFP 1000. A network interface (I/F) control unit 205 controls transmission and reception of data to and from the internal network 100. A scanner I/F control unit 206 controls reading of an original document by a scanner 211. A printer I/F control unit 207 controls print processing and the like by a printer 212. A control panel control unit 208 controls a control panel 210 of a touch-panel type to control display of various kinds of information and input of instructions from a user. A Universal Serial Bus (USB) I/F 213 controls connection of the MFP 1000 with a USB memory. A bus 209 interconnects the CPU 201, the ROM 202, the RAM 203, the HDD 204, the network I/F control unit 205, the scanner I/F control unit 206, the printer I/F control unit 207, the control panel control unit 208, and the USB I/F 213. Control signals from the CPU 201 and data signals between the devices are transmitted and received via the bus 209.

Each of the MFPs 1001 and 1002 in the present exemplary embodiment also has a configuration similar to the configuration of the MFP 1000 illustrated in FIG. 2A.

FIG. 2B is a block diagram illustrating a schematic configuration of the administration server 2000 according to the present exemplary embodiment.

A CPU 221 executes a software program of the administration server 2000 to control the entire administration server 2000. A ROM 222 stores a boot program, fixed parameters, and the like of the administration server 2000. A RAM 223 is used to store a program, temporary data, and the like when the CPU 221 controls the administration server 2000. An HDD 224 stores system software, an application, and various data.

The CPU 221 executes the boot program stored in the ROM 222, and loads a program stored in the HDD 224 into the RAM 223 and executes the loaded program, whereby the CPU 221 controls operation of the administration server 2000. A network I/F control unit 225 controls transmission and reception of data to and from the external network 200. An operation unit of the administration server 2000 can be operated from a PC or a mobile terminal via the network I/F control unit 225.

In the present exemplary embodiment, this operation unit displayed on a PC or a mobile terminal will be referred to as a remote UI. A bus 229 interconnects the CPU 221, the ROM 222, the RAM 223, the HDD 224, and the network I/F control unit 225. Control signals from the CPU 221 and data signals between the devices are transmitted and received via the bus 229.

FIG. 2C is a block diagram illustrating a schematic configuration of the PC 02 according to the present exemplary embodiment.

In the PC 02, a CPU 231 collectively controls accesses from various devices connected to a system bus 239, based on a control program stored in a ROM 232 or an HDD 234 of the PC 02.

The ROM 232 stores a control program and the like that can be executed by the CPU 231.

A RAM 233 mainly functions as a main memory, a work area, or the like of the CPU 231, and a memory capacity of the RAM 233 can be expanded by using an optional RAM connected to an expansion port (not illustrated).

The HDD 234 stores a boot program, various applications, font data, user files, edit files, and the like. In the present exemplary embodiment, the HDD 234 is used, but a secure digital (SD) card, a flash memory, or the like other than the HDD 234 may be used as an external storage.

A network I/F control unit 235 controls transmission and reception of data to and from the external network 200.

A display control unit 236 controls display of a display I/F 237.

An operation control unit 238 controls operation signals of a keyboard I/F 241 and a mouse I/F 240. The keyboard I/F 241 controls key inputs. The mouse I/F 240 controls inputs from a mouse (not illustrated) or a pointing device (not illustrated).

An operation unit of the administration server 2000 in the present exemplary embodiment is displayed as a UI on a web browser displayed by the display I/F 237 of the PC 02, via the network I/F control unit 225. Further, the UI on the web browser is operated via the keyboard I/F 241 or the mouse I/F 240 of the PC 02 to operate the administration server 2000. In the present exemplary embodiment, the UI on the web browser via the network will be referred to as a remote UI.

The system bus 239 interconnects the CPU 231, the ROM 232, the RAM 233, the HDD 234, the network I/F control unit 235, the display control unit 236, and the operation control unit 238. Control signals from the CPU 231 and data signals between the devices are transmitted and received via the system bus 239.

Figure 3A:
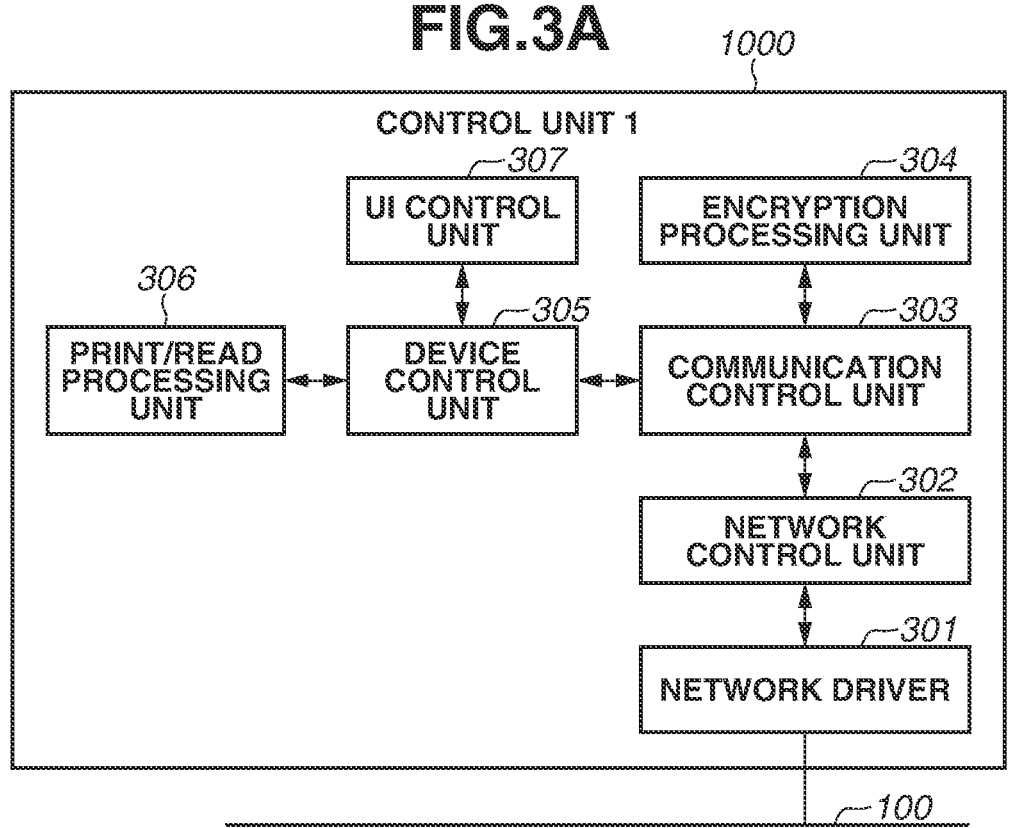
FIG. 3A is a diagram illustrating an example of a software configuration of the MFP according to the exemplary embodiment.

FIG. 3A is a block diagram illustrating software modules included in the MFP 1000 according to the exemplary embodiment. The CPU 201 executes a program loaded into the RAM 203 to implement the software modules illustrated in FIG. 3A.

A network driver 301 controls the network I/F control unit 205 connected to the internal network 100 to transmit and receive data to and from outside via the internal network 100. A network control unit 302 controls communication in a transport layer or lower layers in a network communication protocol, such as the Transmission Control Protocol/Internet Protocol (TCP/IP), to transmit and receive data. A communication control unit 303 is a module for controlling a plurality of communication protocols supported by the MFP 1000. The communication control unit 303 also executes encryption communication based on Transport Layer Security (TLS) or the like supported by the MFP 1000.

An encryption processing unit 304 is a module for executing various kinds of encryption processing, such as data encryption and decryption processing, generation/verification of electronic signature, and Hash value generation. The encryption processing unit 304 performs the encryption processing, also in encryption communication processing based on TLS or the like executed by the communication control unit 303.

A device control unit 305 is a module for generating a control command and control data of the MFP 1000 to comprehensively control the MFP 1000. The device control unit 305 executes user authentication requested via the control panel 210 and the control panel control unit 208, or the network I/F control unit 205. The device control unit 305 records an operation history of the MFP 1000 in the HDD 204 as an audit log.

A print/read processing unit 306 is a module for executing functions, such as printing by the printer 212 and reading of a document by the scanner 211. In the present exemplary embodiment, an instruction for the MFP 1000 to perform scan or print can be also issued by a user via the control panel 210. A UI control unit 307 controls the control panel 210 and the control panel control unit 208.

A control unit including the above-described software configuration of the MFP 1000 illustrated in FIG. 3A is expressed as a control unit 1. In the present specification, the control unit 1 includes the CPU 201, the ROM 202, the RAM 203, and the HDD 204 of the MFP 1000. In a sequence and flowcharts to be described below, a processing procedure performed by the MFP 1000 is stored in a storage unit that is any of the ROM 202, the RAM 203, and the HDD 204 of the control unit 1, and the procedure is executed by the CPU 201.

Figure 3B:
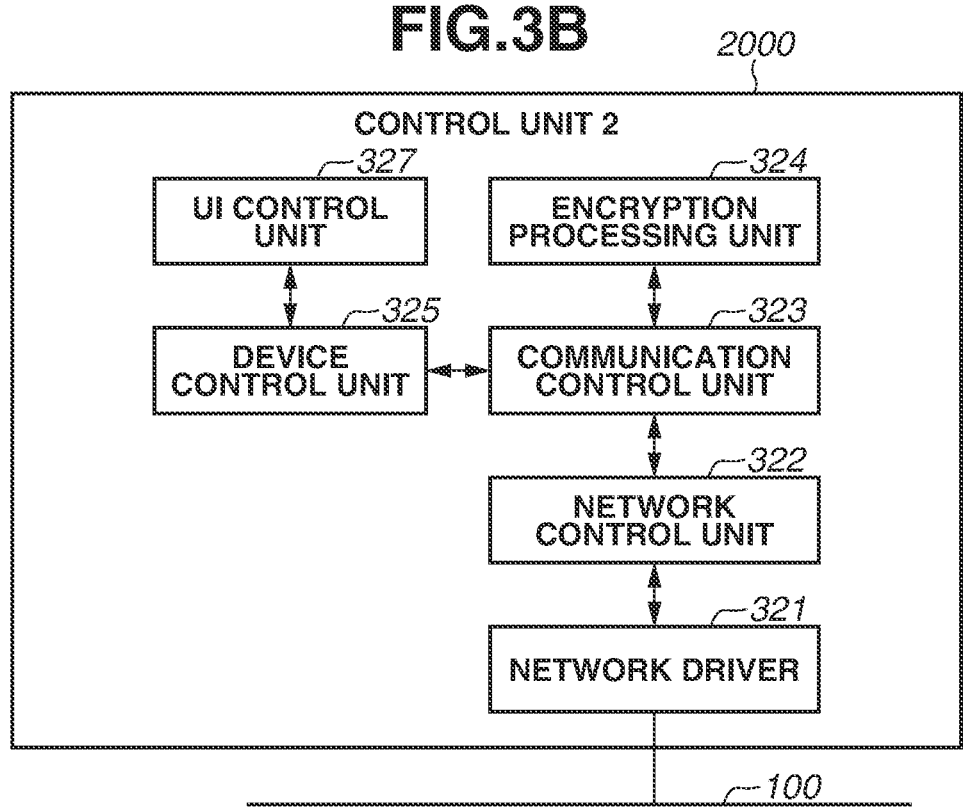
FIG. 3B is a diagram illustrating an example of a software configuration of the administration server according to the exemplary embodiment.

FIG. 3B is a block diagram illustrating software modules included in the administration server 2000 according to the exemplary embodiment. The CPU 221 executes a program loaded into the RAM 223, to implement the software modules illustrated in FIG. 3B.

A network driver 321 controls the network I/F control unit 225 connected to the internal network 100 to transmit and receive data to and from outside via the internal network 100.

A network control unit 322 controls communication in a transport layer or lower layers in a network communication protocol, such as the TCP/IP, to transmit and receive data. A communication control unit 323 is a module for controlling a plurality of communication protocols supported by the administration server 2000. The communication control unit 323 also executes encryption communication based on TLS or the like supported by the administration server 2000.

An encryption processing unit 324 is a module for executing various kinds of encryption processing, such as data encryption and decryption processing, generation/verification of electronic signature, and Hash value generation. The encryption processing unit 324 performs the encryption processing, also in encryption communication processing based on TLS or the like executed by the communication control unit 323.

A device control unit 325 is a module for generating a control command and control data of the administration server 2000 to comprehensively control the administration server 2000. The device control unit 325 records an operation history of the MFP 1000 in the HDD 224 as an audit log.

In the present exemplary embodiment, the administration server 2000 is operated by a remote UI that can be operated from a PC or a mobile terminal via the network I/F control unit 225. A UI control unit 327 controls the remote UI.

A control unit including the above-described software configuration of the administration server 2000 illustrated in FIG. 3B is expressed as a control unit 2. In the present specification, the control unit 2 includes the CPU 221, the ROM 222, the RAM 223, and the HDD 224 of the administration server 2000. In the sequence and the flowcharts to be described below, a processing procedure performed by the administration server 2000 is stored in a storage unit that is any of the ROM 222, the RAM 223, and the HDD 224 of the control unit 2, and the procedure is executed by the CPU 221.

FIG. 4 is a sequence diagram illustrating a procedure of entire processing until the administration server 2000 acquires an audit log from the MFPs having the audit log function, in the system according to the present exemplary embodiment.

In the present exemplary embodiment, the print system is configured such that the MFP 1000, the MFP 1001, the MFP 1002 to an MFP XXXX, the administration server 2000, and the PC 02 communicate with each other via network. Each of the MFPs 1000 to 1002 performs user authentication, receives a print instruction from the operation unit of its own, and controls printing. The administration server 2000 acquires an audit log from each of the MFPs. The PC 02 shares audit log acquisition using the remote UI serving as a UI for operating the administration server 2000. The administration server 2000 is an apparatus provided separately from the MFPs 1000 to 1002, but the administration server 2000 is not particularly limited to the above-described configuration and the function of the administration server 2000 may be included in the MFPs 1000 to 1002.

This sequence starts in response to acceptance of an instruction that the administration server 2000 acquires an audit log.

First, in step S0401, the control unit 2 of the administration server 2000 accepts user-identification information and an instruction to acquire an audit log via the remote UI displayed on the PC 02 from a user.

In the present exemplary embodiment, a description will be provided of a case where an operating user is specified as an audit target in the instruction.

Next, in step S0402, the PC 02 provides an audit log acquisition request to the administration server 2000, together with the user-identification information.

In step S0403, the control unit 2 performs processing for generating an audit log acquisition source list, based on the received user-identification information and audit log acquisition request. The audit log acquisition source in the present exemplary embodiment is a transmission destination to which the instruction to acquire the audit log is to be transmitted from the administration server 2000.

FIG. 5 is a flowchart illustrating the processing for generating the audit log acquisition source list that starts in step S0403 in FIG. 4. The CPU 221 of the control unit 2 executes a program loaded into the RAM 223, to perform the processing.

In step S501, the control unit 2 accepts the audit log acquisition request, together with the user-identification information (user ID). The audit log acquisition request in the present exemplary embodiment includes an audit log acquisition condition. An example of the audit log acquisition condition in the present exemplary embodiment is illustrated in FIG. 11. FIG. 11 illustrates a screen 110 for specifying a condition for acquiring an audit log, and the screen 110 is displayed by the remote UI via the network I/F control unit 225 of the administration server 2000. In the screen 110, the user can specify a condition for audit log acquisition. Examples of the condition to be specified include whether to acquire all audit logs, whether to acquire an audit log of a specific department, whether to acquire an audit log of a certain operating user of a specific MFP, and whether to acquire a certain period of time from when to when an audit log has been recorded. In the present exemplary embodiment, the screen 110 includes a user name (user ID) entry field 111a, a password entry field 111b, acquisition range specifying buttons 112 and 113, an acquisition target entry field 114, and acquisition period specifying fields 115, 116, 117, 118, 119, 120, 121, 122, 123, and 124. The screen 110 is merely an example and the present exemplary embodiment is not limited thereto. In the present exemplary embodiment, a combination of a user name and a password will be referred to as the user-identification information, but the user-identification information may be any type of information as long as the information can identify a user who wants to acquire an audit log.

A user who wants to acquire an audit log enters a user name and a password for authentication to log into the administration server in the user name (user ID) entry field 111a and the password entry field 111b, respectively. Further, the user selects the button 112 to "acquire all audit logs", or the button 113 to "acquire specified audit log", as an acquisition range. In a case where the button 112 is selected, the user dose not input the acquisition range and the acquisition period. In the example illustrated in FIG. 11 in the present exemplary embodiment, the button 112 to "acquire specified audit log" is selected, and an acquisition range and an acquisition period are to be input. The user enters an "assigned group name" or "operating user ID" corresponding to an audit log that the user wants to acquire, in the acquisition target entry field 114. The information to be entered in the acquisition target entry field 114 is a user ID (a user ID 602) or a name corresponding to an assigned group (an assigned group 603) illustrated in FIGS. 6A and 6B. The acquisition target entry field 114 may have a search function, and can present a candidate for a user ID or an assigned group name, based on a word entered by the user. The user specifies a time period for acquiring the audit log, by entering the date and time of each of the start and the end of the period, in the acquisition period specifying fields 115 to 124. The date and time of the start are entered in the specifying field 115 for year, the specifying field 116 for month, the specifying field 117 for day, and the specifying fields for time (i.e., the specifying field 118 for hour and the specifying field 119 for minute). The date and time of the end are entered in the specifying field 120 for year, the d specifying field 121 for month, the d specifying field 122 for day, and the specifying fields for time (i.e., the specifying field 123 for hour and the specifying field 124 for minute).

In step S502, the control unit 2 confirms the audit log acquisition condition specified in the screen 110, and stores the condition in the RAM 223.

Next, in step S503, the control unit 2 acquires a setting for determining an audit log acquisition target device from the HDD 224.

FIG. 6A illustrates a screen 601 (a management table A) of setting for determining an audit log acquisition target device in the present exemplary embodiment. This screen is displayed by the remote UI on the display I/F 237 of the PC 02, via the network I/F control unit 225 of the administration server 2000.

The screen 601 in the present exemplary embodiment includes the user ID 602, the assigned group 603, an acquisition target device setting 604, an enter button 605, and a cancel button 606.

The screen 601 is displayed when an instruction to acquire an audit log is provided for an operating user operated the MFP (the ID of the operating user) or an assigned group of the operating user, and a setting described in the screen 601 is used for determining an assigned group of each operating user and is used for determining from which MFP an audit log is to be acquired. For example, in the screen 601 in FIG. 6A, in a case where acquisition of an audit log is requested for a user 001 that is an operating user of the MFP 1000, it is determined that the acquisition target device is the MFP 1000, and in a case where acquisition of an audit log is requested for a user 002, it is determined that the acquisition target device is the MFPs 1000 and 1001. In a case where acquisition of an audit log is requested for an AA department/01 section, the MFPs 1000, 1001, and 1002 associated with user IDs belonging to the AA department/01 section are the audit-log acquisition target devices. In the present exemplary embodiment, the setting described in the screen 601 is set beforehand by an administrator of the administration server or the MFPs, by using the remote UI.

When the enter button 605 is pressed, the control unit 2 stores the setting values in the HDD 224.

After step S503, the processing proceeds to step S504.

In step S504, the control unit 2 acquires an audit log authority setting from the HDD 224.

FIG. 7A illustrates a screen 701 (a management table B) for setting audit log authority in the present exemplary embodiment, and the screen 701 is displayed by the remote UI via the network I/F control unit 225 of the administration server 2000.

The screen 701 in the present exemplary embodiment includes an assigned group setting 702, an audit-log reference enabled authority setting 703, an audit-log operation enabled authority setting 704, an enter button 705, and a cancel button 706. The setting for audit log authority illustrated in the screen 701 is used to determine whether a user who attempts to acquire an audit log can refer to the audit log and whether the user can perform operations, such as deletion and movement. For example, in the screen 701 in FIG. 7A, an audit log associated with a user belonging to the AA department/01 section can be referred to by a security administrator, an AA department director, and an AA department/01 section manager as user roles, and the security administrator can perform operations including deletion and movement. In the present exemplary embodiment, a security administrator can move and delete data of an audit log, while others, such as a director and a section manager, can refer to data of a user associated with his/her own department. However, the setting is freely set depending on use environments of individual users, and is not particularly limited. In FIG. 7A, a user who acquires an audit log has authority for a group to which the user belongs, but the scope of the authority is not limited thereto. In the present exemplary embodiment, the audit log authority is set beforehand by the administrator of the administration server or the MFP by using the remote UI. When the enter button 705 is pressed, the control unit 2 stores the setting values in the HDD 224. The screen 701 in FIG. 7A has a screen layout in which a user role having authority is associated with an assigned group. However, the screen layout of the screen 701 is not particularly limited. As in a screen 721 (a management table b) in FIG. 7B, a log-reference enabled assigned group 723 and an audit-log operation enabled assigned group 724 may be set in association with a user role 722.

After step S504, the processing proceeds to step S505.

In step S505, the control unit 2 compares the audit log acquisition condition, the setting for determining the audit log acquisition target device, and the audit log authority setting acquired in step S502 to step S504. For example, in step S506, as a result of the comparison in step S505, the control unit 2 determines whether an audit log acquisition source satisfying the condition is present.

In a case where the control unit 2 determines that an audit log acquisition source satisfying the condition is present (YES in step S506), the processing proceeds to step S507. In step S507, the control unit 2 generates an audit log acquisition source list, and stores the generated list in the RAM 223. Then, the processing in FIG. 5 ends, and the processing subsequently proceeds to step S0404 in FIG. 4. This audit log acquisition source list is data having information about from which MFP the audit log is to be acquired by the administration server 2000 in and after step S0404 in FIG. 4.

In a case where the control unit 2 determines that no audit log acquisition source satisfying the condition is present (NO in step S506), the processing proceeds to step S508. In step S508, the control unit 2 displays an audit log acquisition error on the remote UI. Then, the processing in FIG. 5 ends, and the processing subsequently proceeds to step S0417 in FIG. 4. In step S0417, the control unit 2 displays the result on the remote UI. Then, the processing in FIG. 4 ends.

An example of the processing branched in step S506 to step S508 based on the condition of the audit log acquisition request will be described with reference to FIG. 6A and FIG. 7A. A description will be provided of a case where the control unit 2 accepts the audit log acquisition request for the user 001 (the operating user) from the AA department/01 section manager (the user corresponding to the user-identification information) in step S501. In this case, the user 001 belongs to the AA department/01 section as illustrated in FIG. 6A, and the AA department/01 section manager has an authority to refer to the audit log (reference enabled authority) of the AA department/01 section as illustrated in FIG. 7A. Since the user corresponding to the user-identification information and having issued the audit log acquisition request and the assigned group of the operating user that is the audit log acquisition target match each other, the processing proceeds to step S507. Further, a description will be provided of a case where the control unit 2 accepts the audit log acquisition request for the user 001 (the operating user) from the AA department director (the user corresponding to the user-identification information). In this case, the user 001 belongs to the AA department/01 section as illustrated in FIG. 6A, and the AA department director has the reference enabled authority for the audit log of the AA department as illustrated in FIG. 7B. The AA department and the AA department/01 section do not match each other in terms of assigned group, but there is a correspondence between the AA department/01 section and the AA department because the AA department includes the AA department/01 section, i.e., the group to which the user corresponding to the user-identification information belongs includes the assigned group of the operating user. Then, the processing proceeds to step S507. Furthermore, a description will be provided of a case where the control unit 2 accepts the audit log acquisition request for a user 006 (the operating user) from the AA department director (the user corresponding to the user-identification information) in step S501. In this case, the user 006 belongs to a BB department/01 section as illustrated in FIG. 6A, and the AA department director does not have the reference enabled authority for the audit log of the BB department/01 section as illustrated in FIG. 7A. Thus, the condition neither matches nor corresponds to the audit log acquisition request, and the processing proceeds to step S508.

After the processing in FIG. 5, the processing proceeds to step S0404 in FIG. 4.

Step S0404 and thereafter represent processing in a case where the audit log acquisition source list is generated in the processing in step S507 in FIG. 5. The processing in and after step S0404 will be described using a case where the MFPs 1000, 1001, 1002, . . . , and XXXX are present in the audit log acquisition source list, as an example.

In step S0404, the control unit 2 of the administration server 2000 transmits an audit log acquisition request to the MFP 1000.

In step S0405, the control unit 1 of the MFP 1000 performs audit log acquisition processing.

FIG. 8 is a flowchart illustrating the audit log acquisition processing that starts in step S0405 in FIG. 4. The CPU 201 of the control unit 1 executes a program loaded into the RAM 203, to perform the processing.

In step S801, the control unit 1 of the MFP 1000 accepts the audit log acquisition request from the administration server 2000. This audit log acquisition request includes information of the audit log acquisition condition used in step S0402 in FIG. 4 and step S502 in FIG. 5.

In step S802, the control unit 1 acquires an audit log satisfying the audit log acquisition condition by extracting the audit log from the HDD 204 by filtering. For example, in a case where the acquisition request is for an audit log associated with the user 001, the control unit 1 acquires an audit log recorded when the user 001 has operated the MFP 1000, from the HDD 204 by filtering.

Next, in step S803, the control unit 1 determines whether an audit log satisfying the audit log acquisition condition is successfully acquired.

In a case where the control unit 1 determines that an audit log satisfying the audit log acquisition condition is successfully acquired (YES in step S803), the processing proceeds to step S804. In step S804, the control unit 1 generates audit log data to be transmitted to the administration server 2000. The audit log data here refers to the audit log extracted based on the audit log acquisition condition. Then, the processing in FIG. 8 ends.

In a case where the control unit 1 determines that an audit log satisfying the audit log acquisition condition is not successfully acquired (NO in step S803), the processing proceeds to step S805. In step S805, the control unit 1 generates an error notification and returns the error notification to the administration server 2000.

Then, the processing in FIG. 8 ends.

After completion of the processing in FIG. 8, the processing proceeds to step S0406 in FIG. 4. In step S0406, the control unit 1 returns the result to the administration server 2000. The content transmitted in this step S0406 is the audit log data generated in step S804 or the error notification generated in step S805.

In the audit log acquisition, an audit log can be extracted (filtered) by the above-described processing in step S501 to step S507 in FIG. 5 and processing in step S802 to step 804 in FIG. 8, based on the authority of the user having issued the acquisition request. Accordingly, an audit log desired by a specific user can be acquired in a state where confidential information is secured.

The description will continue referring back to FIG. 4.

In a case where another MFP is listed as the audit log acquisition source after step S0406, processing similar to step S0404 to step S0406 is performed for another MFP. FIG. 4 is an example in which similar processing is performed for each of the MFPs 1001, 1002, . . . , and XXXX, and processing in step S0407 to step 0409, processing in step S0410 to step S0412, and processing in step S0413 to step S0415 are similar to the respective processing in step S0404 to step 0406. In a case where, for example, an MFP as the acquisition source is powered off, or the network is disconnected, there can be also a case where no response is returned from the MFP, and the control unit 2 of the administration server 2000 cannot acquire an audit log. In such a case, in the present exemplary embodiment, the control unit 2 provides an audit log acquisition request to the MFP again, after a lapse of a certain period of time. However, how to handle such a case is not particularly limited. For example, the control unit 2 may perform processing of attaching information on an MFP resulted in an acquisition failure, when returning the result to the PC 02.

In a case where acquisition of the audit log for the MFP as the audit log acquisition target is completed, the control unit 2 of the administration server 2000 proceeds to step S0416.

In step S0416, the control unit 2 combines the acquired audit logs.

Then, in step S0417, the control unit 2 returns data of the audit logs to the PC 02.

The above-described control is for acquiring the audit log based on the user authority in the print apparatus having the audit log function. Since an audit log is acquired based on a user authority, a desired audit log can be acquired while audit logs are secured as confidential information. Further, information desired by a user can be extracted and acquired, and thus, there is also an effect of increasing usability of an audit log.

In the above exemplary embodiment, the administration server 2000 acquires the audit log for each of the MFPs based on the instruction from the user via the PC 02. The acquired audit log in this case is an audit log extracted in the MFP 1000 based on the instruction of the PC 02. In another exemplary embodiment, unlike the above exemplary embodiment, all the audit logs stored in the HDD 204 of the MFP may be acquired in response to an instruction from the PC 02, and an audit log may be extracted in the administration server from all the acquired audit logs.

Figure 10:
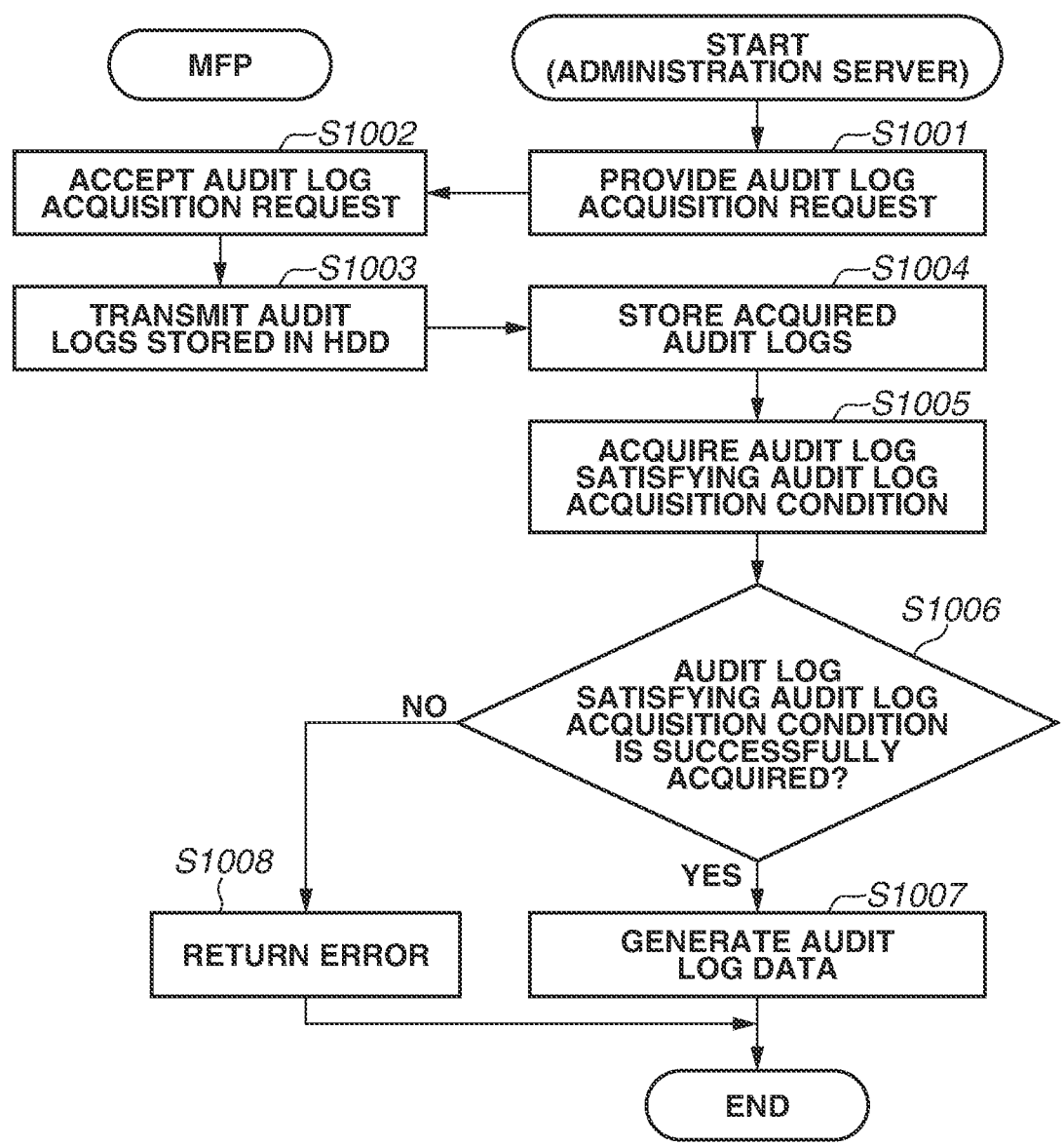
FIG. 10 is a flowchart illustrating audit log acquisition processing according to another exemplary embodiment.

FIG. 10 illustrates a flowchart representing audit log acquisition processing that starts in step S0405 in FIG. 4 in this case. The CPU 201 of the control unit 1 executes a program loaded into the RAM 203, to perform this processing.

In step S1001, the control unit 2 provides an audit log acquisition request to the MFP. This audit log acquisition request includes the information of the audit log acquisition condition used in step S0402 in FIG. 4 and step S502 in FIG. 5.

Step S1002 corresponds to step S801.

In step S1003, the control unit 1 transmits all the audit logs stored in the HDD 204 to the administration server.

In step S1004, the control unit 2 stores all the acquired logs of the MFP in the HDD 224. Here, step S1004 to step S1006 may be performed for each of the MFPs, or may be collectively performed after the audit logs of a plurality of MFPs that are acquisition sources of the audit log acquisition source list are acquired.

Step S1005 corresponds to step S802. For example, in a case where the acquisition request is for an audit log associated with the user 001, the control unit 2 acquires an audit log recorded when the user 001 has operated the MFP, from the HDD 224 by filtering.

Next, in step S1006, the control unit 2 determines whether an audit log satisfying the audit log acquisition condition is successfully acquired.

In a case where the control unit 2 determines that an audit log satisfying the audit log acquisition condition is successfully acquired (YES in step S1006), the processing proceeds to step S1007. In step S1007, the control unit 2 generates audit log data, and the processing in FIG. 10 ends.

In a case where the control unit 2 determines that an audit log satisfying the audit log acquisition condition is not successfully acquired (NO in step S1006), the processing proceeds to step S1008. In step S1008, the control unit 2 returns an error notification result. Then, the processing in FIG. 10 ends.

After completion of the processing in FIG. 10, the processing proceeds to step S0416 in FIG. 4.

In FIG. 5 and FIG. 10, the administration server starts the acquisition of the audit log in response to receipt of the audit log acquisition request from the user via the PC 02. However, the administration server 2000 may regularly obtain the audit log of the MFP and store the obtained audit log in the HDD 224 of the administration server 2000 beforehand, without waiting for the audit log acquisition request. In other words, there may be adopted a configuration in which the administration server 2000 acquires an audit log based on an instruction of the PC 02 from the audit logs which have been obtained from the MFP and stored in the HDD 224 beforehand, and the configuration is not particularly limited.

In a case where the audit log has been obtained from the MFP beforehand, the audit log may be transmitted from the MFP each time when a predetermined time elapses after the last transmission, or the audit log may be received by the administration server each time when a predetermined time elapses after the last reception. The method for obtaining the audit log is not particularly limited, and may be a method of transmitting the audit log from the MFP each time when the amount of data reaches a predetermined amount, instead of transmitting the audit log each time when the predetermined time elapses.

In the case where the administration server 2000 acquires the audit log from each of the MFPs at a timing of when the instruction arrives from the PC 02 as in the above exemplary embodiment, the latest audit log can be acquired. In contrast, in the case where the audit logs are accumulated beforehand in the administration server 2000 as in the present exemplary embodiment, the audit log can be transmitted immediately upon receipt of the instruction from the PC 02. Either configuration can be employed based on which one is preferred by a user who checks the audit log.

Next, an exemplary embodiment different from the above exemplary embodiments of the present disclosure will be described.

In the above exemplary embodiments, the administrator sets beforehand which MFP is used by the user in the screen 601 in FIG. 6A, and the audit log associated with the user is acquired from the target MFP. However, MFPs used by a user can vary for reasons such as transfer of the user and addition of a new MFP, and thus it becomes a burden for the administrator to set a user and an MFP in association with each other each time such a change occurs.

In the present exemplary embodiment, a description will be provided of control for automatically registering an MFP used by a user in an MFP having an audit log function.

In the present exemplary embodiment, configurations and processing procedures omitted from below descriptions is similar to those of the above exemplary embodiments, including the network configuration, the hardware configuration and the software configuration of each of the MFP 1000 and the administration server 2000 that are information processing apparatuses, the processing for generating the audit log acquisition source list, and the audit log acquisition processing.

FIG. 9 is a flowchart illustrating login processing of the MFP 1000. The CPU 201 of the control unit 1 executes a program loaded into the RAM 203, to perform this processing.

The login processing starts in step S901 in FIG. 9.

In step S901, the control unit 1 displays a login screen on the control panel 210. Then, the processing proceeds to step S902.

In step S902, the control panel 210 accepts an input of user information and a password from a user. The input user information and password are stored in the RAM 203 via the control panel control unit 208. In the present exemplary embodiment, the RAM 203 is used to temporarily store the user information and the password, but the storage for this purpose is not particularly limited, and a different device that can store information, such as the HDD 204, may be used. This holds true for exemplary embodiments to be described below. In the present exemplary embodiment, the password associated with the user information managed for user authentication is stored in the HDD 204 of the MFP 1000, but is not limited thereto and may be stored in the administration server or on Identity-as-a-Service (IDaaS).

In step S903, the control unit 1 verifies whether the input password is correct, by acquiring a password associated with the input user information from the HDD 204 and comparing the acquired password with the input password. Then, the processing proceeds to step S904.

In step S904, the control unit 1 determines whether the input password is correct, and in a case where the control unit 1 determines that the input password is not correct (NO in step S904), the control unit 1 displays an error on the control panel 210, and the processing returns to step S902. In a case where the control unit 1 determines that the input password is correct (YES in step S904), the processing proceeds to step 905. In step 905, the control unit 1 permits the login to the MFP 1000.

In step S906, the control unit 1 stores the user information of the logged-in user in the RAM 203.

Next, in step S907, the control unit 1 generates use history information in the MFP, based on the user information stored in the RAM 203 and device information of the MFP to which the user has logged in. The use history information in the MFP in the present exemplary embodiment is information about when and which MFP is used by which user.

In step S908, the control unit 1 transmits the use history information in the MFP to the administration server 2000. Then, the processing in FIG. 9 ends.

The control unit 2 of the administration server 2000 updates the screen 601 in FIG. 6A stored in the HDD 224, by performing the processing in step S908. For example, in a case where the user 001 newly logs in to the MFP 1001 in the state where the screen 601 in FIG. 6A is set, the MFP 1001 is added to the acquisition target device setting 604 of the user 001, and the screen 601 in FIG. 6A is updated to the screen 601 (a management table a) in FIG. 6B. In the processing in step S908, the use history information in the MFP may be transmitted to the administration server 2000 every time the user operates a new MFP. Alternatively, the use history information for some period may be accumulated and transmitted regularly. The administration server 2000 may initiate acquisition of the use history information from the MFP. In other words, the processing in step S908 is not particularly limited.

By the above-described processing in step S907 and step S908, the setting for determining a target device for acquiring the audit log is automatically added in response to the login processing by the user, without a setting performed beforehand by the administrator to set which MFP is used by the user. Thus, a burden on the administrator to add the setting can be eliminated.

In the present exemplary embodiment, the setting for determining the target device for acquiring the audit log is added in response to the login processing by the user. However, this setting is not particularly limited, and may be set in response to a different operation, such as an operation of a case where a function, such as the copy function, of the MFP is used for the first time.

According to embodiments of the present disclosure, security can be improved in an apparatus having an audit log function.

According to embodiments of the present disclosure, since an audit log of an operating user of an audit target associated with a group to which the user belongs can be acquired, an audit log can be acquired based on user authority in a print apparatus having an audit log function.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-026675, filed Feb. 22, 2021, which is hereby incorporated by reference herein in its entirety.

What is claimed is:
1. A print system comprising:
at least one print apparatus; and
a server configured to communicate with the at least one print apparatus via a network,
wherein the server includes:
first one or more controllers having one or more processors and one or more memories, the first one or more controllers being configured to:
accept user-identification information and an instruction to acquire an audit log of an operating user of the at least one print apparatus, the instruction specifying the operating user as an audit target; and
transmit, in a case where an assigned group of a user corresponding to the user-identification information and an assigned group of the operating user as the audit target match or correspond to each other, the instruction to the at last one print apparatus, and
wherein the at least one print apparatus includes:
second one or more controllers having one or more processors and one or more memories, the second one or more controllers being configured to:
control storing the audit log and the operating user of the print apparatus in association with each other in the second one or more controllers; and
transmit the audit log of the operating user specified in the instruction to the server.

2. The print system according to claim 1,
wherein, in the server, the first one or more controllers configured to:
control storing at least a first management table in which the user and the assigned group of the user are associated with each other, and a second management table in which the operating user, the assigned group of the operating user, and the print apparatus used by the operating user are associated with each other; and
determine the user and the assigned group of the user, and the operating user and the assigned group of the operating user, and
wherein, in the determining, at least the first management table is used to determine the assigned group of the user, and at least the second management table is used to determine the assigned group of the operating user.

3. The print system according to claim 2, wherein the at least one print apparatus as a transmission destination of the instruction to be transmitted is at least one print apparatus that has been used by the operating user and of which association with the operating user is indicated in the second management table.

4. The print system according to claim 2,
wherein, in the at least one print apparatus, the second one or more controllers configured to:
authenticate the operating user who uses the print apparatus; and
transmit a use history of the operating user who has used the print apparatus, to the server, and
wherein the server uses the use history to update the print apparatus used by the operating user in the second management table.

5. The print system according to claim 1,
wherein the server communicates with an information terminal via the network, and
wherein, in a case where the assigned group of the user and the assigned group of the operating user neither match nor correspond to each other, the server displays an error on the information terminal.

6. The print system according to claim 1,
wherein the server further includes:
a display unit configured to display a screen,
wherein the first one or more controllers configured to:

receive the audit log of the operating user specified in the instruction, and wherein the display unit displays an audit log which combines audit logs received from the at least one print apparatus.

7. The print system according to claim 1, wherein the network includes at least a network not protected by a firewall.

8. A server configured to communicate with at least one print apparatus via a network, the at least one print apparatus storing an audit log and an operating user in association with each other, the server comprising:
one or more controllers having one or more processors and one or more memories, the one or more controllers being configured to:
accept user-identification information and an instruction to acquire an audit log of an operating user of the at least one print apparatus, the instruction specifying the operating user as an audit target;
transmit, in a case where an assigned group of a user corresponding to the user-identification information and an assigned group of the operating user as the audit target match or correspond to each other, the instruction to the at least one print apparatus; and
receive the audit log of the operating user specified in the instruction, from the at least one print apparatus.

9. The server according to claim 8, wherein the one or more controllers configured to:
control storing at least a first management table in which the user and the assigned group of the user are associated with each other, and a second management table in which the operating user, the assigned group of the operating user, and the print apparatus used by the operating user are associated with each other; and
determine the user and the assigned group of the user, and the operating user and the assigned group of the operating user,
wherein, in the determining, at least the first management table is used to determine the assigned group of the user, and at least the second management table is used to determine the assigned group of the operating user.

10. The server according to claim 9, wherein the at least one print apparatus as a transmission destination of the instruction to be transmitted is at least one print apparatus that has been used by the operating user and of which association with the operating user is indicated in the second management table.

11. The server according to claim 8,
wherein the server communicates with an information terminal via the network, and
wherein, in a case where the assigned group of the user and the assigned group of the operating user neither match nor correspond to each other, the server displays an error on the information terminal.

12. The server according to claim 8, further comprising:
a display unit configured to display a screen,
wherein the display unit displays an audit log which combines audit logs received from the at least one print apparatus.

13. A server configured to communicate with at least one print apparatus via a network, the at least one print apparatus storing an audit log and an operating user in association with each other, the server comprising:
one or more controllers having one or more processors and one or more memories, the one or more controllers being configured to:
receive an audit log from the at least one print apparatus; and
accept user-identification information and an instruction to acquire an audit log of an operating user of the at least one print apparatus, the instruction specifying the operating user as an audit target,
wherein, in a case where an assigned group of a user corresponding to the user-identification information and an assigned group of the operating user as the audit target match or correspond to each other, the server extracts the audit log of the operating user specified in the instruction from the received audit log.

14. The server according to claim 13, wherein the one or more controllers configured to:
control storing at least a first management table in which the user and the assigned group of the user are associated with each other, and a second management table in which the operating user, the assigned group of the operating user, and the print apparatus used by the operating user are associated with each other; and
determine the user and the assigned group of the user, and the operating user and the assigned group of the operating user,
wherein, in the determining, at least the first management table is used to determine the assigned group of the user, and at least the second management table is used to determine the assigned group of the operating user.

15. The server according to claim 13,
wherein the server communicates with an information terminal via the network, and
wherein, in a case where the assigned group of the user and the assigned group of the operating user neither match nor correspond to each other, the server displays an error on the information terminal.

16. The server according to claim 13, wherein, the one or more controllers configured to:
receive the audit log transmitted from the at least one print apparatus in response to acceptance of the instruction.

17. The server according to claim 13, wherein the one or more controllers configured to:
receive the audit log transmitted from the at least one print apparatus in response to elapse of a predetermined time after previous transmission.

18. A method of controlling a print system including at least one print apparatus and a server configured to communicate with the at least one print apparatus via a network, the at least one print apparatus storing an audit log and an operating user in association with each other, the method comprising:
accepting user-identification information and an instruction to acquire an audit log of an operating user of the at least one print apparatus by the server, the instruction specifying the operating user as an audit target;
transmitting, as first transmitting, in a case where an assigned group of a user corresponding to the user-identification information and an assigned group of the operating user as the audit target match or correspond to each other, the instruction from the server to the at least one print apparatus; and
transmitting, as second transmitting, the audit log of the operating user specified in the instruction received by the at least one print apparatus from the server, from the at least one print apparatus to the server.

19. A method of controlling a server configured to communicate with at least one print apparatus via a network, the at least one print apparatus storing an audit log and an operating user in association with each other, the method comprising:
- accepting user-identification information and an instruction to acquire an audit log of an operating user, the instruction specifying the operating user as an audit target;
- transmitting, in a case where an assigned group of a user corresponding to the user-identification information and an assigned group of the operating user as the audit target match or correspond to each other, the instruction to the at least one print apparatus; and
- receiving the audit log of the operating user specified in the instruction from the at least one print apparatus.

20. A method of controlling a server configured to communicate with at least one print apparatus via a network, the at least one print apparatus storing an audit log and an operating user in association with each other, the method comprising:
- receiving an audit log from the at least one print apparatus; and
- accepting user-identification information and an instruction to acquire an audit log of an operating user, the instruction specifying the operating user as an audit target,
- wherein the server extracts, in a case where an assigned group of a user corresponding to the user-identification information and an assigned group of the operating user as the audit target match or correspond to each other, an audit log of the operating user specified in the instruction from the received audit log.

* * * * *